United States Patent
Johnston et al.

(10) Patent No.: US 9,855,823 B2
(45) Date of Patent: Jan. 2, 2018

(54) HVAC SYSTEM WITH POSITIVE TEMPERATURE COEFFICIENT VARYING ALONG LENGTH OF HEAT ROD

(71) Applicant: Tesla Motors, Inc., Palo Alto, CA (US)

(72) Inventors: Vincent G. Johnston, Half Moon Bay, CA (US); Curt R. O'Donnell, Sunnyvale, CA (US)

(73) Assignee: TESLA, INC., Palo Alto, CA (US)

( * ) Notice: Subject to any disclaimer, the term of this patent is extended or adjusted under 35 U.S.C. 154(b) by 1001 days.

(21) Appl. No.: 14/017,170

(22) Filed: Sep. 3, 2013

(65) Prior Publication Data
US 2015/0060558 A1    Mar. 5, 2015

(51) Int. Cl.
*B60H 1/00* (2006.01)
*B60H 1/22* (2006.01)

(52) U.S. Cl.
CPC ....... *B60H 1/2225* (2013.01); *B60H 1/00064* (2013.01); *B60H 2001/00128* (2013.01); *B60H 2001/00192* (2013.01); *B60H 2001/2287* (2013.01)

(58) Field of Classification Search
CPC .............. B60H 1/00064; B60H 1/2225; B60H 2001/00128; B60H 2001/2287
USPC .......................................................... 237/5
See application file for complete search history.

(56) References Cited

U.S. PATENT DOCUMENTS

| | | | | |
|---|---|---|---|---|
| 3,953,711 A | * | 4/1976 | Eck | H05B 3/748 219/458.1 |
| 4,375,056 A | * | 2/1983 | Baxter | G01K 7/183 338/195 |
| 5,471,034 A | * | 11/1995 | Kawate | B60H 1/2225 219/483 |
| 6,285,005 B1 | * | 9/2001 | Aakalu | H05B 3/14 219/209 |
| 6,675,873 B2 | * | 1/2004 | Ieda | B60H 1/00428 165/43 |
| 7,098,426 B2 | * | 8/2006 | Bohlender | B60H 1/2225 219/202 |
| 7,676,144 B2 | * | 3/2010 | Zeyen | F24H 3/0429 219/520 |
| 9,210,739 B2 | * | 12/2015 | Chabach | H05B 3/12 |
| 2007/0045274 A1 | | 3/2007 | Lee | |
| 2007/0295709 A1 | * | 12/2007 | Willkens | F27D 99/0006 219/268 |

(Continued)

FOREIGN PATENT DOCUMENTS

WO        2005049349 A1    6/2005

OTHER PUBLICATIONS

Temperature Coefficient, Wikipedia, Jun. 30, 2012.

*Primary Examiner* — Avinash Savani
*Assistant Examiner* — Deepak Deean
(74) *Attorney, Agent, or Firm* — Garlick & Markison; Bruce E. Garlick

(57) ABSTRACT

In a first aspect, a vehicle HVAC system includes: a housing that defines at least first and second air conduits to a vehicle interior compartment; and at least first and second heat rods that each traverses the first and second air conduits, wherein a first positive temperature coefficient along a length of the first heat rod is greater at the first air conduit than at the second air conduit, and wherein a second positive temperature coefficient along a length of the second heat rod is greater at the second air conduit than at the first air conduit.

22 Claims, 3 Drawing Sheets

(56) References Cited

U.S. PATENT DOCUMENTS

| | | | |
|---|---|---|---|
| 2009/0179023 A1* | 7/2009 | Annavarapu | F23Q 7/001 219/260 |
| 2012/0168125 A1 | 7/2012 | Johnston et al. | |
| 2013/0112221 A1* | 5/2013 | Kock | A45D 1/28 132/211 |

* cited by examiner

HVAC SYSTEM WITH POSITIVE TEMPERATURE COEFFICIENT VARYING ALONG LENGTH OF HEAT ROD

BACKGROUND

Most vehicles that have an interior compartment (sometimes referred to as a passenger compartment) provide some form of heating and/or ventilation for the person(s) traveling inside the vehicle. For example, a heating, ventilation and air conditioning (HVAC) system is sometimes provided.

Some HVAC systems are designed to provide multi-zone climate control. For example, different heating (or cooling) settings can be made for the driver and front-seat passenger, respectively. Climate settings can sometimes be differentiated between the respective rows of seating in the vehicle, for examples to provide second-row (or third-row) passengers increased control over the temperature or other climate aspects in their respective area.

Differentiated temperature settings can pose particular challenges for HVAC equipment. For example, some systems have electric heating rods that traverse the respective conduits for different climate zones, and the differentiated temperature settings are then metered by restricting (or blocking) the air flow in one of the conduits (i.e., the one with the cooler setting). However, the heat rod(s) that the system energizes to provide heat for the conduit with the hotter setting can overheat due to the lack of air flow.

SUMMARY

In a first aspect, a vehicle HVAC system includes: a housing that defines at least first and second air conduits to a vehicle interior compartment; and at least first and second heat rods that each traverses the first and second air conduits, wherein a first positive temperature coefficient along a length of the first heat rod is greater at the first air conduit than at the second air conduit, and wherein a second positive temperature coefficient along a length of the second heat rod is greater at the second air conduit than at the first air conduit.

In a second aspect, a method includes: receiving a first temperature value that sets a first temperature for a first air conduit of a vehicle; receiving a second temperature value that sets a second temperature for a second air conduit of the vehicle; wherein if the first temperature is higher than the second temperature, the method further comprises energizing at least a first heat rod in an HVAC system of the vehicle, a first positive temperature coefficient along a length of the first heat rod being greater at the first air conduit than at the second air conduit; and wherein if the second temperature is higher than the first temperature, the method further comprises energizing at least a second heat rod in the HVAC system, a second positive temperature coefficient along a length of the second heat rod being greater at the second air conduit than at the first air conduit, each of the first and second heat rods traversing the first and second air conduits.

Implementations can include any or all of the following features. The first air conduit leads to a driver position, and the second air conduit leads to a passenger position. Each of the first and second heat rods comprises different stones along its length. The different stones abut each other at a divider between the first and second air conduits. Stones on one half of the first heat rod have a higher positive temperature coefficient than stones on another half of the first heat rod. Each of the first and second heat rods traverses the first and second air conduits at a right angle with a divider between the first and second air conduits. The vehicle HVAC system further includes at least a third heat rod wherein a third positive temperature coefficient along a length of the third heat rod does not vary between the first and second air conduits. Each of the first and second heat rods is controlled individually.

DETAILED DESCRIPTION

This document describes systems and techniques that improve heating of interior vehicle compartments, particularly the ability to provide substantially different temperatures in different areas of the vehicle using electrically heated resistive elements. In some implementations, a single heater consists of several heating rods that are spaced apart from each other and connected by interleaving aluminum fins to dissipate the heat from the heating rods to the fluid stream. The resistive element in the heating rod is a ceramic element which has a positive thermal coefficient (PTC) such that the electrical resistance of the ceramic element increases with its temperature. The PTC property of the ceramic element provides a self-limiting temperature at which no additional power can be dissipated through the element and the temperature of the element remains constant. The resistance versus temperature function of the ceramic element can be specifically established by adjusting the physical properties of the ceramic material and this allows for establishing a specific limiting temperature of the ceramic.

In some implementations, an individual heating rod consists of multiple ceramic elements, some of which have a higher self limiting temperature, and thus a higher output temperature, than the others. For example, the high output ceramic elements can be grouped on one half of the heating rod, and the lower output ceramic elements can be grouped on the other half of the heating rod.

In some implementations, each rod is controlled individually. In other implementations, two or more rods can be controlled by the same power source device.

In some implementations, a single heater having multiple heating rods is used to provide heat to multiple air outlets. For example, the heat rods can be transversely mounted across respective air conduits to the driver and passenger sides. To heat the driver side significantly more than the passenger side, the system energizes a heat rod that has its PTC biased toward the driver side by having the higher output ceramic elements on the driver side of the energized heating rod. Similarly, to heat the passenger side significantly more than the driver side, the system energizes another heat rod that has its PTC biased toward the passenger side by having the higher output ceramic elements on the passenger side of the energized heating rod.

Figure 1:
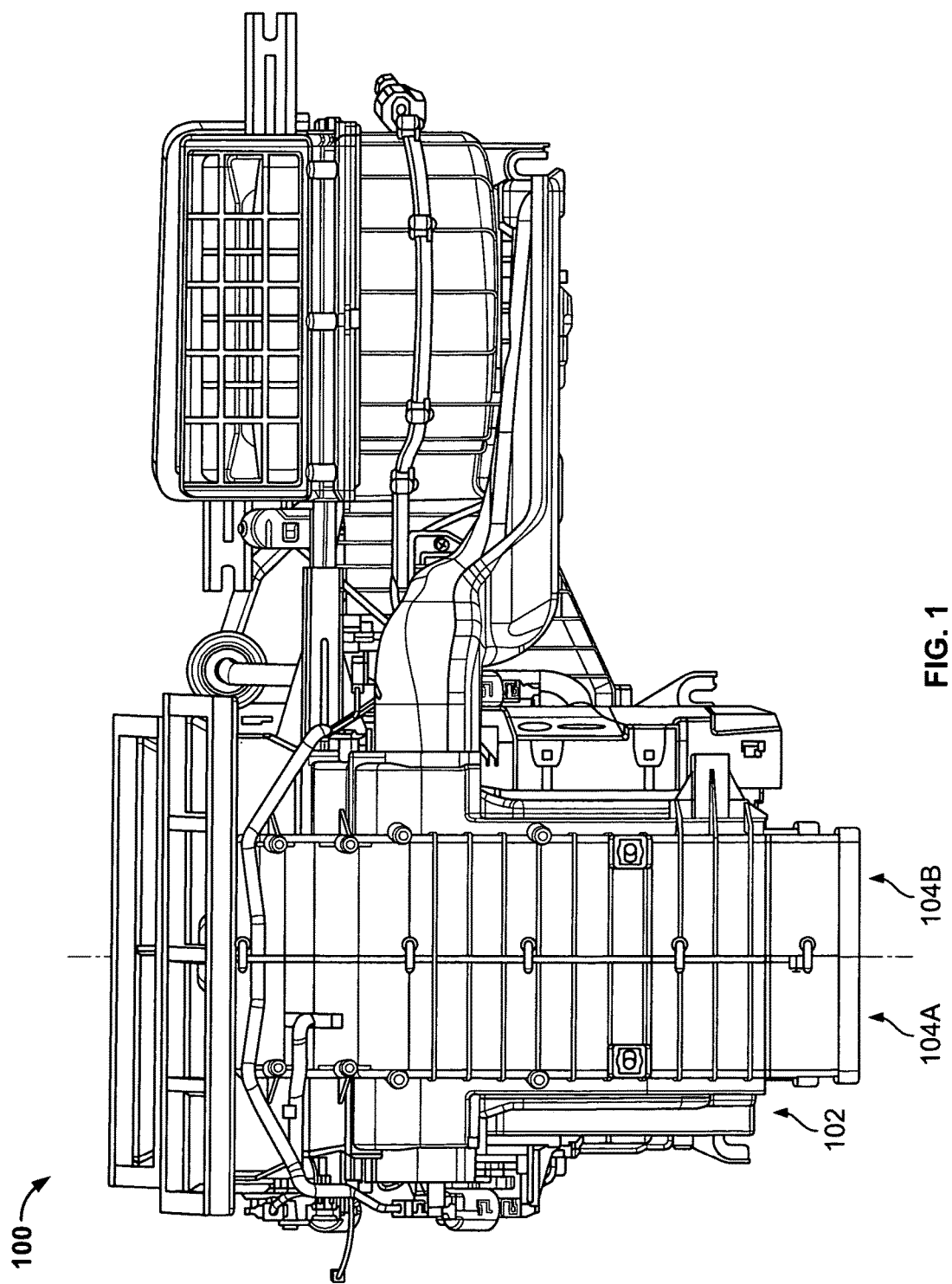
FIG. 1 shows an example HVAC system including an air heater.

FIG. 1 shows an example HVAC system 100 including an air heater 102. In some implementations, the HVAC system is configured to operate in response to climate control settings generated either by direct user input (e.g., the user sets a specific temperature) or by a control mechanism in the vehicle (e.g., the vehicle has predefined programmatic settings for HVAC equipment). For example, the HVAC system can regulate one or more climate aspects of an interior compartment, including, but not limited to, temperature, air flow, or humidity.

In the illustrated example, the HVAC system 100 has a first heating side 104A and a second heating side 104B, and is therefore capable of providing climate control in two separate zones. For example, the first heating side 104A can be directed to a driver's seat and the second heating side 104B can be directed to one or more passenger seats. Advantageously, the air heater 102 can be used also when the temperature settings between climate zones are significantly different from each other.

Figure 2:
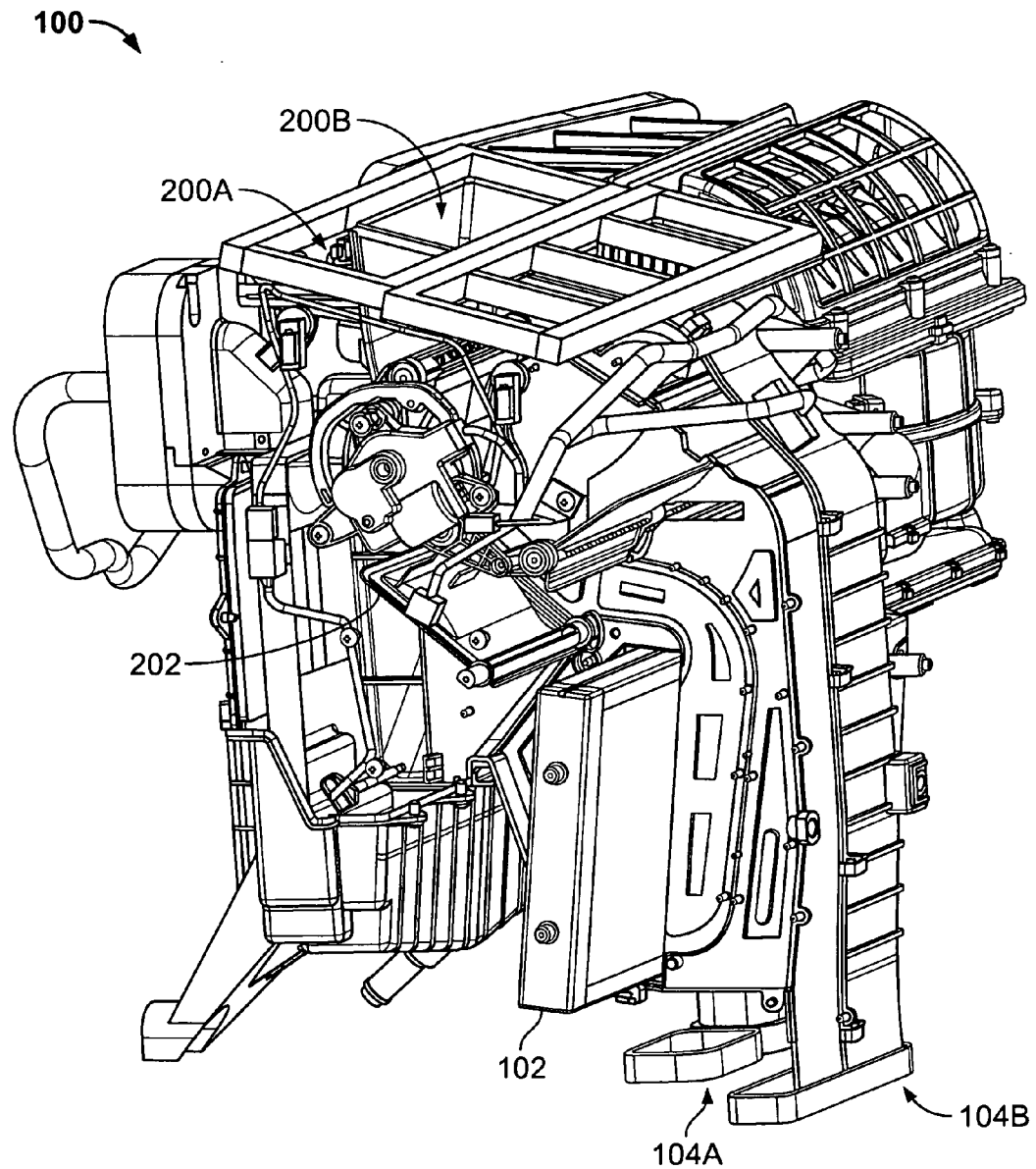
FIG. 2 is a partial cross section showing an example of the air heater from FIG. 1.

FIG. 2 is a partial cross section showing an example of the air heater 102 from FIG. 1. Particularly, a portion of the housing of the HVAC system 100 has been omitted to show the inside of the first heating side 104A. The heating side 104B, in contrast, is shown as in the previous figure. The air heater 102 bridges the heating sides 104A-B. The air that flows past the air heater on the first heating side 104A continues into a first duct 200A (e.g., a driver side duct), and the air that flows past the air heater on the second heating side 104B continues into a second duct 200B (e.g., a passenger side duct). The air heater includes two or more heat rods, each of which traverses the respective air conduits formed by the heating sides 104A-B. By selectively energizing one or more specific heat rods, a temperature differential can be created between the two climate zones.

In some implementations, the HVAC system 100 also includes at least one flue 202 that can be used to reduce air flow through either air conduit. Here, the flue is located on the first heating side 104A and is shown in an open position; that is, the flue currently does not restrict air flow on the first heating side or through the first duct 200A. In some situations, the flue can be used to limit the air flow through that heater side, but the air heater could become overheated if not enough air passes through it.

Figure 3:
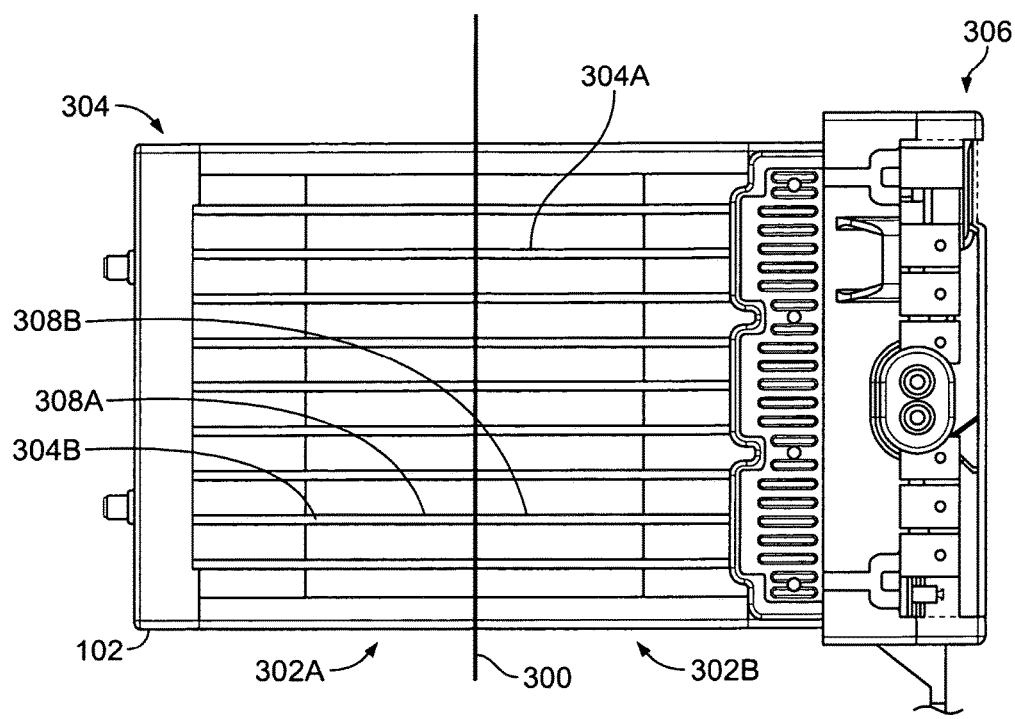
FIG. 3 shows an example of the air heater from FIG. 1 wherein a divider separates the respective air conduits.

FIG. 3 shows an example of the air heater 102 from FIG. 1 wherein a divider 300 separates the respective air conduits. For example, with reference briefly again to FIG. 2, the divider can be comprised of a wall between the first and second heating sides 104A-B that serves to define the respective air conduits to the first and second ducts 200A-B. In this example, the climate zones will be referred to as a driver side 302A and a passenger side 302B for simplicity, with the understanding that other climate zones can be defined in some implementations.

Here, the air heater 102 has nine heat rods 304. Each of the heat rods traverses the driver side 302A and the passenger side 302B, in this example at a right angle to the divider 300. Each of the heat rods is configured to generate heat when electrically energized. In some implementations, current flow through the heat rods can be controlled using switches 306. For example, the switches can comprise insulated-gate bipolar transistors (IGBTs). The switches can be cycled on and off during operation, to name just one example.

The second heat rod is here labeled 304A and the eighth heat rod is here labeled 304B. Each of the heat rods 304A-B has a biased PTC. Here, the heat rod 304A is considered to be biased toward the passenger side 302B, and the heat rod 304B is considered to be biased toward the driver side 302A.

The PTC bias is a result of the heat rod having different material properties along its length. For example, a first portion 308A of the heat rod 304B is here made of a material that has a relatively high thermal output, and a second portion 308B of the heat rod 304B is here made of a material that has a relatively low thermal output. That is, the PTC along the length of the rod 304B is greater at the first portion 308A than at the second portion 308B.

When current flows through the heat rod 304B, more thermal energy will be generated by the first portion 308A (i.e., in the driver side 302A) than by the second portion 308B (i.e., in the passenger side 302B). In other words, energizing the heat rod 304B leads to more heat flowing to the driver side than to the passenger side. That is, when trying to keep the driver side hot and the passenger side cool, it is advantageous to run current through the heat rod 304B, because it delivers more thermal energy on the driver side. In other implementations, two or more heat rods can be biased toward the driver side.

The heat rod 304A, in turn, is PTC biased in the opposite direction. The material with relatively high thermal output is here on the passenger side 302B and the material with relatively low thermal output is here on the driver side 302A. That is, the PTC operating temperature greater on the passenger side than on the driver side. In other words, the heat rod 304A should be energized when trying to keep the passenger side hot and the driver side cool, because it delivers more thermal energy on the passenger side. In other implementations, two or more heat rods can be biased toward the passenger side.

Examples of the heat rods 304A-B are described below. The other heat rods 304—i.e., heat rods one, three, four, five, six, seven and nine—can be unbiased. That is, in these heat rods the thermal output can be substantially even throughout the length of the rod, for a given current. Accordingly, one or more of these heat rods can be energized (or de-energized) to increase (or decrease) the overall amount of heat available when a temperature differential is required.

Each of the switches 306 can control current through one or more of the heat rods. In some implementations, when six IGBTs are used, they can control individual heat rods as follows:

| IGBT | 1 | 2 | 3 | 4 | 5 | 6 |
|---|---|---|---|---|---|---|
| Heat rod number | 2 | 8 | 5 | 6 | 1 | 3 |
| Heat rod number | | | | 4 | 7 | 9 |

For example, when the fifth IGBT is switched on it allows current to flow through the heat rods one and seven.

Various combinations of the IGBTs can be switched on to provide different temperature settings with or without a PTC bias, for example as follows:

| Combination | IGBT(s) On | Heat rod(s) On | Bias? |
|---|---|---|---|
| A | 1 | Two | Passenger |
| B | 2 | Eight | Driver |
| C | 1, 2, 3 | Two, five, eight | — |
| D | 1, 2, 3, 4 | Two, four, five, six, eight | — |
| E | 1, 2, 3, 4, 5 | One, two, four, five, six, seven, eight | — |
| F | All | All | — |

Figure 4:
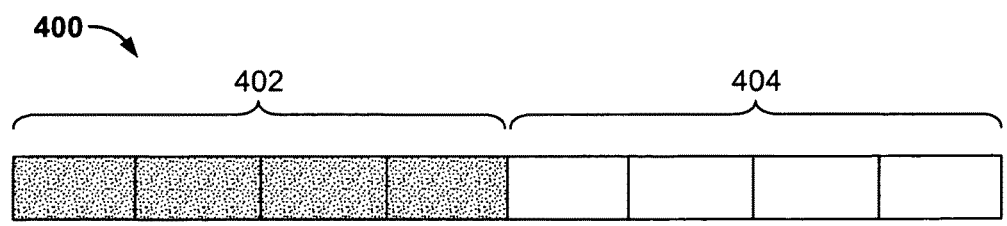
FIG. 4 shows an example of a heat rod having a biased positive temperature coefficient.

FIG. 4 shows an example of a heat rod 400 having a biased positive temperature coefficient. Here, the heat rod comprises eight stones, sometimes referred to as "PTC thermistors" or "PTC-resistors," or simply "PTC stones". Some of the stones have different thermal properties from each other. For example, stones 402 are here made of a material that has a relatively high thermal output, and stones 404 are here made of a material that has a relatively low thermal output. In this example, the stones 402 abut the stones 404 in the middle (e.g., at the divider). In other implementations, different combinations of stone materials, such as unequal numbers of stones, can be used.

PTC thermistors are doped polycrystalline ceramic on a base of barium titanate ($BaTiO_3$). Selected doping produces a desired high electrical conductivity of this material at low temperatures.

In operation, an HVAC system having two or more PTC-biased heat rods can be used to provide differentiated temperature between climate zones. Assume, for example, that the driver of the vehicle prefers a cool environment and therefore sets the temperature for the driver side relatively low. The driver does this by entering a temperature value (e.g., as a number on a Fahrenheit scale or on an arbitrary temperature scale) into the vehicle's climate control equipment.

Assume, moreover, that the front passenger of the vehicle prefers a hot environment and therefore sets the temperature for the passenger side relatively high. The passenger enters a corresponding temperature value in the vehicle's climate control equipment.

Based on these different temperature settings, the vehicle will use one or more heat rods in the HVAC system. For example, if the driver side temperature should be higher than the passenger side temperature, a heat rod biased toward the driver side can be energized, and vice versa.

The amount of heat generated by the heat rod can depend on the duration in which it is cycled on. For example, a longer duration of power cycling can produce a higher overall output from the heat rod.

A number of implementations have been described as examples. Nevertheless, other implementations are covered by the following claims.

What is claimed is:

1. A method comprising:
   receiving a first temperature value that sets a first temperature for a first air conduit of a vehicle;
   receiving a second temperature value that sets a second temperature for a second air conduit of the vehicle;
   wherein if the first temperature is higher than the second temperature, the method further comprises energizing at least a first heat rod in an HVAC system of the vehicle,
   wherein the first heat rod has different material properties along its length such that a first portion of the first heat rod has a first positive thermal coefficient and a second portion of the first heat rod has a second positive thermal coefficient, and wherein the first positive thermal coefficient is greater than the second positive thermal coefficient wherein each of the first portion of the first heat rod and the first portion of the second heat rod traverses the first air conduit and wherein the second portion of the first heat rod and the second portion of the second heat rod traverse the second air conduit, and
   wherein the first heat rod and the second heat rod are substantially parallel.

2. The method of claim 1, wherein the first air conduit leads to a driver position, and the second air conduit leads to a passenger position.

3. The method of claim 1, wherein each of the first heat rod and the second heat rod comprises a respective plurality of stones along their respective length.

4. The method of claim 3, wherein two stones of the respective plurality of stones of the first heat rod abut each other at a divider between the first and second air conduits.

5. The method of claim 4, wherein a first stone of the respective plurality of stones of the first heat rod is located on the first portion of the first heat rod, and a second stone of the respective plurality of stones of the first heat rod is located on the second portion of the second heat rod, and wherein the first stone has the first positive thermal coefficient and the second stone has the second positive thermal coefficient.

6. The method of claim 1, wherein each of the first and second heat rods traverses the first and second air conduits at a right angle with a divider between the first and second air conduits.

7. The method of claim 1, further comprising at least a third heat rod having a fifth positive thermal coefficient, and wherein the third heat rod traverses the first and second air conduits.

8. The method of claim 1, wherein each of the first and second heat rods is controlled individually.

9. The method of claim 3, wherein the respective plurality of stones are made of ceramic.

10. The method of claim 7, wherein the at least a third heat rod comprises a plurality of third heat rods each having the fifth positive thermal coefficient, and wherein each of the plurality of third heat rods traverse the first and second air conduits.

11. The method of claim 8, wherein the first and second heat rods are controlled individually using insulated-gate bipolar transistors (IGBTs).

12. A method comprising:
    energizing at least a first heat rod in an HVAC system when a first temperature for a first air conduit is higher than a second temperature for a second air conduit,
    wherein the first heat rod has different material properties along its length such that a first portion of the first heat rod has a first positive thermal coefficient and a second portion of the first heat rod has a second positive thermal coefficient, and wherein the first positive thermal coefficient is greater than the second positive thermal coefficient; and
    energizing at least a second heat rod in the HVAC system when the second temperature for the second air conduit is higher than a first temperature for the first air conduit, wherein the second heat rod has different material properties along its length such that a first portion of the second heat rod has a third positive thermal coefficient and a second portion of the second heat rod has a fourth positive thermal coefficient, and wherein the fourth positive thermal coefficient is greater than the third positive thermal coefficient;
    wherein each of the first portion of the first heat rod and the first portion of the second heat rod traverses the first air conduit and wherein the second portion of the first heat rod and the second portion of the second heat rod traverse the second air conduit, and
    wherein the first heat rod and the second heat rod are substantially parallel.

13. The method of claim 12, wherein the first air conduit leads to a driver position, and the second air conduit leads to a passenger position.

14. The method of claim 12, wherein each of the first heat rod and the second heat rod comprises a respective plurality of stones along its respective length.

15. The method of claim 14, wherein the respective plurality of stones are made of ceramic.

16. The method of claim 14, wherein two stones of the respective plurality of stones of the first heat rod abut each other at a divider between the first and second air conduits.

17. The method of claim 16, wherein a first stone of the respective plurality of stones of the first heat rod is located on the first portion of the first heat rod, and a second stone of the respective plurality of stones of the first heat rod is located on the second portion of the second heat rod, and wherein the first stone has the first positive thermal coefficient and the second stone has the second positive thermal coefficient.

18. The method of claim 12, wherein each of the first and second heat rods traverses the first and second air conduits at a right angle with a divider between the first and second air conduits.

19. The method of claim 18, further comprising a plurality of third heat rods each having the fifth positive thermal coefficient, and wherein each of the plurality of third heat rods traverses the first and second air conduits.

20. The method of claim 12, further comprising at least a third heat rod having a fifth positive thermal coefficient, and wherein the third heat rod traverses the first and second air conduits.

21. The method of claim 12, wherein each of the first and second heat rods is controlled individually.

22. The method of claim 21, wherein the first and second heat rods are controlled individually using insulated-gate bipolar transistors (IGBTs).

* * * * *